(12) United States Patent
Yamamoto et al.

(10) Patent No.: US 8,727,063 B1
(45) Date of Patent: May 20, 2014

(54) MOUNTING STRUCTURE OF A POWER UNIT FOR A UTILITY VEHICLE

(71) Applicant: Kawasaki Jukogyo Kabushiki Kaisha, Hyogo (JP)

(72) Inventors: Teruaki Yamamoto, Kakogawa (JP); Akiyuki Yamasaki, Amagasaki (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 13/728,393

(22) Filed: Dec. 27, 2012

(51) Int. Cl.
*B60K 5/12* (2006.01)

(52) U.S. Cl.
USPC ............ 180/292; 180/312; 180/377; 180/291

(58) Field of Classification Search
USPC ................. 180/292, 312, 377, 381, 291, 382; 248/560
See application file for complete search history.

(56) References Cited

U.S. PATENT DOCUMENTS

| | | | | |
|---|---|---|---|---|
| 1,950,637 A * | 3/1934 | Taub | | 180/292 |
| 4,449,603 A * | 5/1984 | Langwieder et al. | | 180/232 |
| 4,564,082 A * | 1/1986 | Takehara et al. | | 180/312 |
| 4,842,258 A * | 6/1989 | Misaka et al. | | 267/140.13 |
| 4,941,544 A * | 7/1990 | Fischle et al. | | 180/292 |
| 5,129,479 A * | 7/1992 | Fujii et al. | | 180/297 |
| 5,740,876 A * | 4/1998 | Shimose et al. | | 180/232 |
| 6,386,309 B1 * | 5/2002 | Park | | 180/300 |
| 6,823,960 B2 * | 11/2004 | Shimizu et al. | | 180/292 |
| 6,981,566 B2 * | 1/2006 | Unfried et al. | | 180/292 |
| 7,032,701 B2 * | 4/2006 | Yoshida et al. | | 180/291 |
| 7,506,718 B2 * | 3/2009 | Morita et al. | | 180/376 |
| 7,708,103 B2 * | 5/2010 | Okuyama et al. | | 180/299 |
| 7,886,861 B2 * | 2/2011 | Nozaki et al. | | 180/232 |
| 2002/0183155 A1 * | 12/2002 | Pollman | | 475/51 |
| 2003/0173134 A1 * | 9/2003 | Unfried et al. | | 180/312 |
| 2004/0089494 A1 * | 5/2004 | Fukuda | | 180/377 |
| 2009/0139791 A1 * | 6/2009 | Matsuda et al. | | 180/292 |
| 2010/0107453 A1 * | 5/2010 | Kisse et al. | | 37/195 |
| 2012/0285764 A1 * | 11/2012 | Compton | | 180/312 |

\* cited by examiner

*Primary Examiner* — J. Allen Shriver, II
*Assistant Examiner* — Steve Clemmons
(74) *Attorney, Agent, or Firm* — Wenderoth, Lind & Ponack, L.L.P.

(57) ABSTRACT

In a mounting structure of a power unit for a utility vehicle, the power unit includes an engine and a transmission coupled onto one side of the engine in a vehicular lengthwise direction. A lower end substantially at the center of the engine in a vehicular widthwise direction and a lower end substantially at the center of the transmission in the vehicular widthwise direction are mounted to an upper surface of a chassis frame by a front mounting mechanism with a damper and a rear mounting mechanism with a damper.

4 Claims, 13 Drawing Sheets

MOUNTING STRUCTURE OF A POWER UNIT FOR A UTILITY VEHICLE

BACKGROUND OF THE INVENTION

1. Field of the Invention

The present invention relates to a mounting structure of a power unit for a utility vehicle including an engine and a transmission connected onto one side of the engine in a lengthwise direction of a vehicle.

2. Description of the Related Art

Examples of a structure of a power unit for a utility vehicle include a structure in which a transmission is formed independently of an engine and a structure in which a transmission is molded integrally with a crank case for an engine. In the structure in which a transmission is formed independently of an engine, for example, the engine and the transmission are securely arranged on a sub frame in a vehicular lengthwise direction. Then, the sub frame is fixed to a chassis frame via a damper.

Conventionally, in any mounting structure for mounting a power unit onto a chassis frame, a plurality of mounting portions having a width over the substantially entire width of the power unit in a vehicular widthwise direction are arranged with vehicular lengthwise intervals, or a plurality of pairs of mounting portions, each pair of which is arranged at a predetermined interval in a vehicular widthwise direction, are arranged with vehicular lengthwise intervals.

In the case of the above mounting structure, the mounting portion for the power unit transmits a transmitting force caused by engine vibrations to the chassis frame as force for vibrating the chassis frame in a vertical direction.

However, when the chassis frame vertically vibrates, ride quality of the vehicle is degraded. As a prior art document of a utility vehicle mounting a power unit thereon, there is U.S. Pat. No. 7,506,718 filed by the present applicant.

SUMMARY OF THE INVENTION

The present invention has been made to solve the above-described problem. An object of the present invention is to provide a power unit for a utility vehicle, in which vertical vibrations are reduced in a chassis frame to thus improve a ride quality of the vehicle by devising a mounting structure of the power unit.

In order to solve the above-described problem, according to the present invention, there is provided a mounting structure of a power unit for a utility vehicle, the power unit including an engine and a transmission coupled onto one side of the engine in a vehicular lengthwise direction. A lower end substantially at the center of the engine in a vehicular widthwise direction and a lower end substantially at the center of the transmission in the vehicular widthwise direction are mounted to an upper surface of a chassis frame by a front mounting mechanism with a damper and a rear mounting mechanism with a damper.

With the above configuration, transmitting force caused by engine vibrations is transmitted to the chassis frame as force for rolling the chassis frame on an axis in a substantially lengthwise direction connecting the front and rear mounting mechanisms. Consequently, the transmitting force caused by the engine vibrations is hardly transmitted to the chassis frame in the vertical direction, in comparison with the structure in which mounting mechanisms are arranged with intervals in the vehicular widthwise direction in the related art. Consequently, a passenger receives no vertical vibration, whereby an excellent ride quality is secured.

The mounting structure of the power unit for a utility vehicle may preferably adopt the following configurations.

(a) A torque rod for restricting the power unit from rolling in the vehicular widthwise direction is stretched between the power unit and the chassis frame. In this case, it is preferable that the torque rod should be disposed at an upper portion of the engine.

With the above configuration, the torque rod can restrict the power unit from rolling in the vehicular widthwise direction, thereby suppressing the rolling vibrations in the chassis frame, so as to further improve a ride quality. Moreover, the torque rod directly stops the engine serving as a vibration source, thus achieving excellent vibration suppression.

(b) The mounting mechanism for the engine is connected to the chassis frame via a tightening member to be inserted from above, and the mounting mechanism for the transmission is connected to the chassis frame via a connecting shaft to be inserted in the vehicular widthwise direction.

The transmission has smaller vibrations than those in the engine serving as the vibration source. Therefore, with the above configuration, the vibrations in the transmission can be sufficiently suppressed while a connecting shaft can be readily attached or detached sideways in a connection structure with a lateral connecting shaft.

(c) The transmission is formed independently of the engine, and is connected to one end of the engine in the lengthwise direction by a connecting bracket.

In the structure in which the engine and the transmission are independent of each other and are connected to each other, the length becomes greater in the lengthwise direction in comparison with a structure in which a transmission is molded integrally with a crank case for an engine. Even in this case, it is possible to suppress the vertical vibrations from being caused in the chassis frame by the engine vibrations.

(d) In the structure in which the connecting bracket has the mounting portion, the connecting bracket is mounted to the upper surface of the chassis frame by an intermediate mounting mechanism with a damper on a straight line connecting the front and rear mounting mechanisms to each other.

With the above configuration, the power unit is mounted to the chassis frame at three points, that is, at the fore, rear, and intermediate portions. Therefore, the mounting strength can be enhanced.

DETAILED DESCRIPTION OF THE INVENTION

Embodiments of the Invention

FIGS. 1 to 15 show a power unit for a utility vehicle according to the present invention. A description will be given of one embodiment according to the present invention with reference to the attached drawings. For the sake of convenience of explanation, in the following descriptions, the lengthwise direction of a utility vehicle is referred to as the lengthwise direction of an engine and other component parts; and the right and left viewed from a passenger riding in the utility vehicle (the right and left viewed from behind the vehicle) in a vehicular widthwise direction are referred to as the right and left of the vehicle, the engine, and the other component parts.

Figure 1:
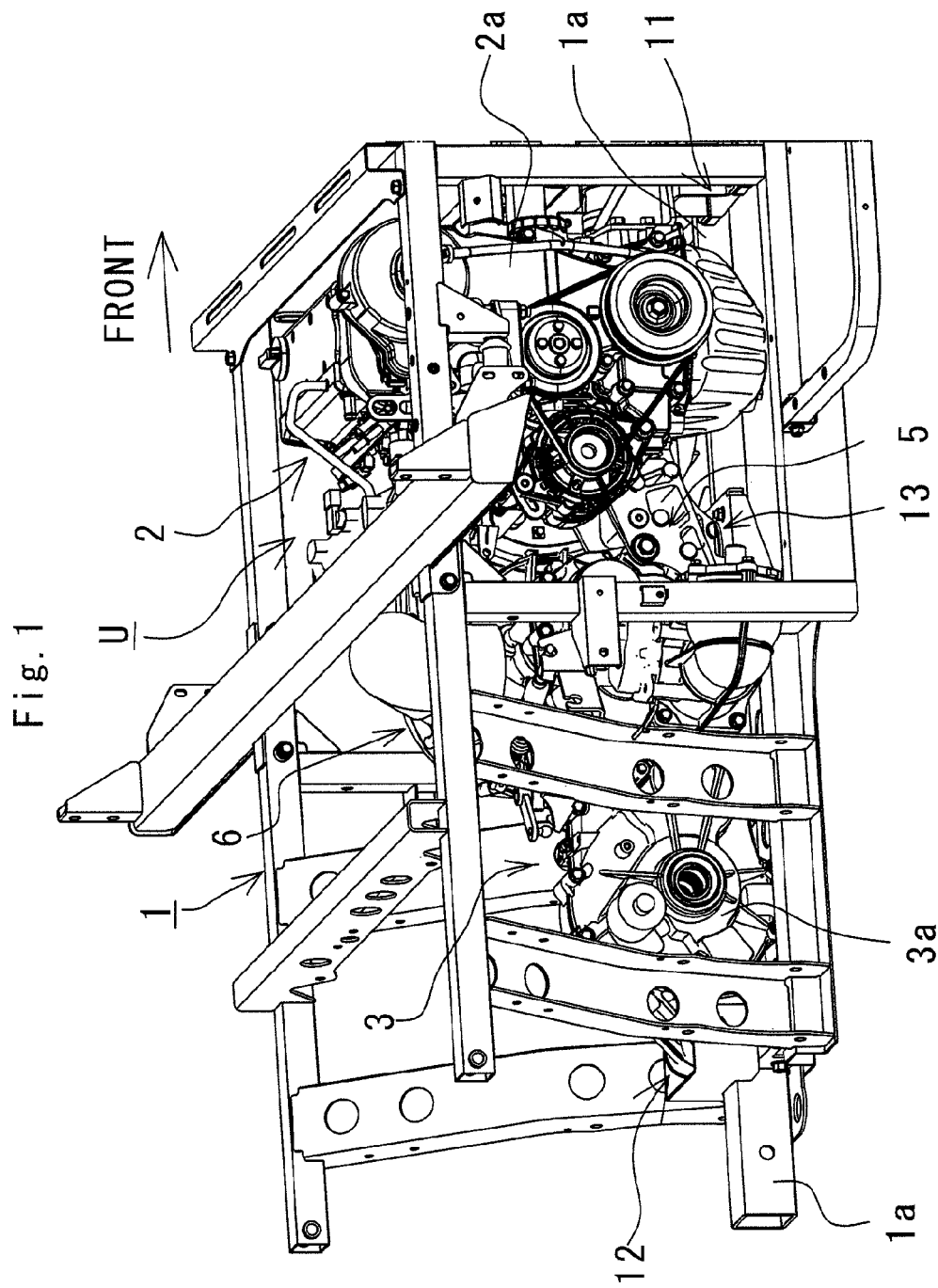
FIG. 1 is a perspective view showing a power unit for a utility vehicle according to the present invention.

FIG. 1 is a perspective view showing a power unit U, wherein a chassis frame 1 is constituted of a plurality of frame members and formed into a substantially rectangular shape being elongated in a vehicular lengthwise direction. The power unit U is disposed at a rear portion of the chassis frame 1. The power unit U is supported at an upper surface of a lower frame member 1a of the chassis frame 1. FIG. 1 shows only the rear portion of the chassis frame 1, and the front portion of the chassis frame 1 is omitted.

The power unit U is provided with an engine 2, a gear type transmission 3 disposed at a rear portion of the engine 2, a connecting bracket 5 for rigidly connecting the engine 2 and the gear type transmission 3 to each other, and a V-belt type continuously variable transmission 6 disposed on the left of the engine 2 and the gear type transmission 3. The engine 2 is a parallel 3-cylinder engine, in which three cylinders are arranged in a vehicular widthwise direction inside of a cylinder block 2a. The gear type transmission 3 integrally includes a final reduction gear case 3a for rear wheels at a rear portion thereof.

The connecting bracket 5 is interposed between the engine 2 and the gear type transmission 3 in the vehicular lengthwise direction. The connecting bracket 5 is adapted to rigidly connect a rear end of the cylinder block 2a of the engine 2 and a fore end of the gear type transmission 3 to each other.

Figure 3:
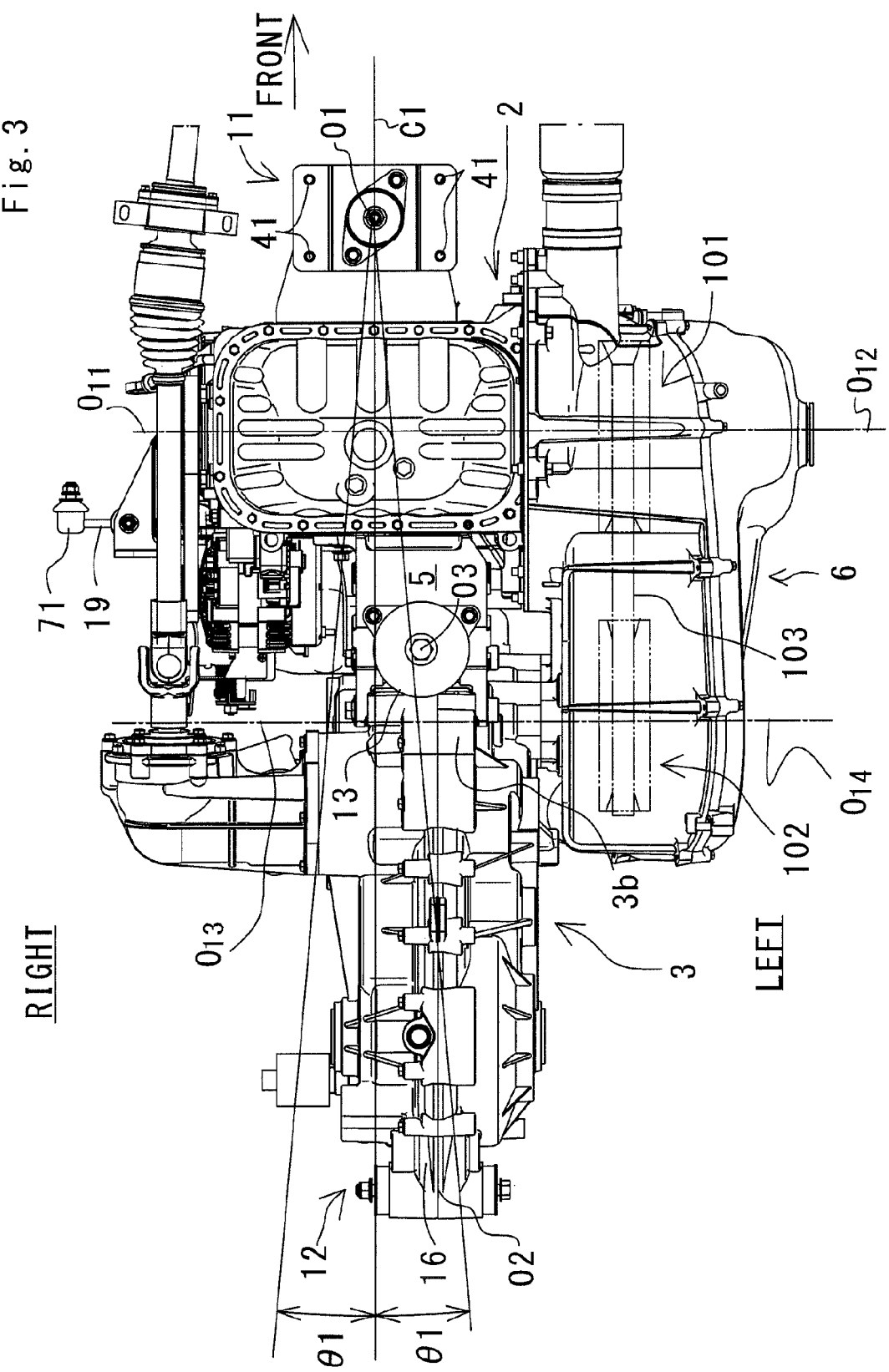
FIG. 3 is a bottom view showing the power unit shown in FIG. 1.

FIG. 3 is a bottom view showing the power unit U, wherein the V-belt type continuously variable transmission 6 is, as is well known, configured by an input drive shaft (having an axis O12) connected to a crankshaft (having an axis O11), a drive pulley 101 disposed on the input shaft, an output driven shaft (having an axis O14) connected to a gearshift input shaft (having an axis O13) of the gear type transmission 3, a driven pulley 102 disposed on the speed change output shaft, and a V belt 103 stretched between both of the pulleys. The V-belt type continuously variable transmission 6 is designed to continuously change the speed of the rotation of the crankshaft so as to transmit it to the gearshift input shaft of the gear type transmission 3.

Figure 2:
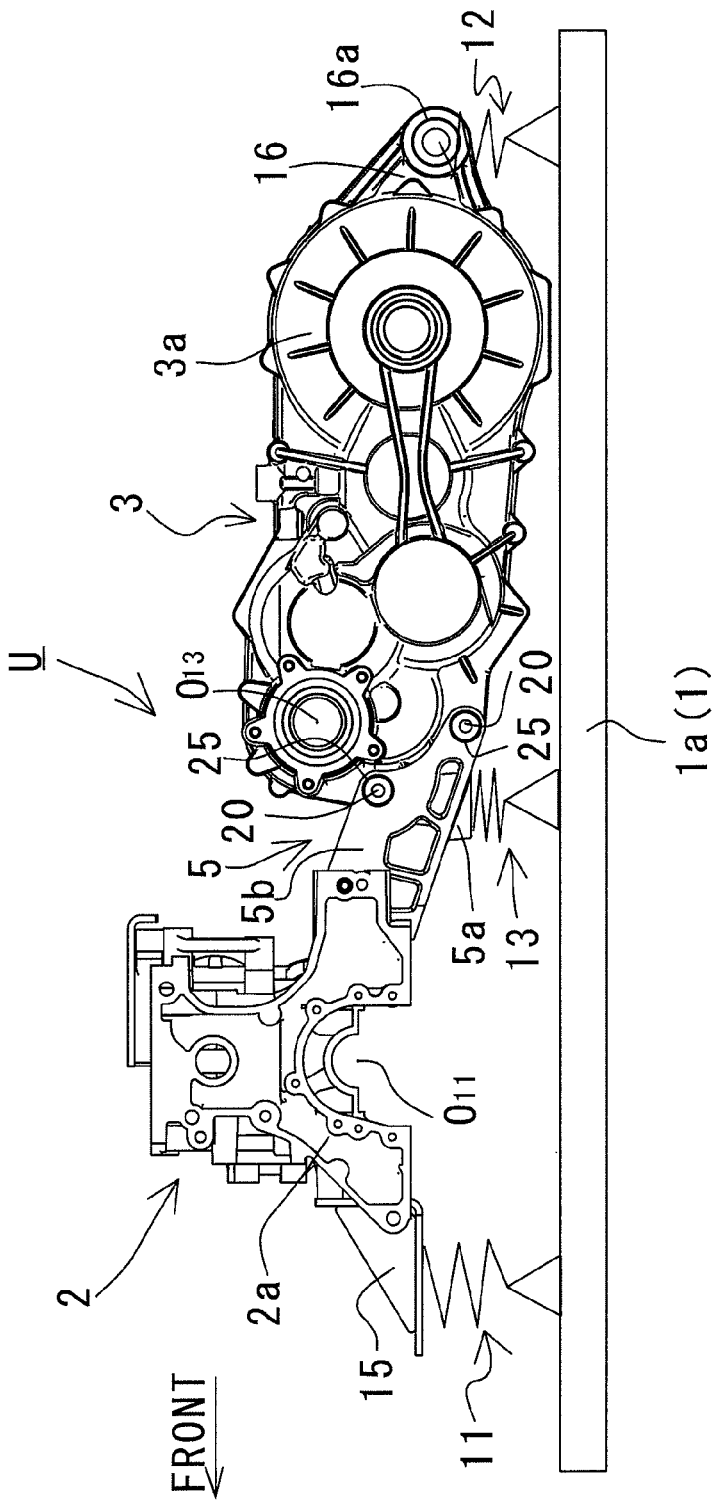
FIG. 2 is a left side view schematically showing the power unit shown in FIG. 1.

FIG. 2 is a left side view schematically showing the power unit of FIG. 1. The entire power unit U is resiliently supported at an upper surface of a lower frame member 1a of the chassis frame 1 by three mounting mechanisms, that is, a front mounting mechanism 11, a rear mounting mechanism 12, and an intermediate mounting mechanism 13. Each of the three mounting mechanisms 11, 12, and 13 is equipped with a damper function. The front mounting mechanism 11 is adapted to resiliently support a front bracket 15 from below. The front bracket 15 is securely fixed to a fore lower end of the cylinder block 2a of the engine 2. The rear mounting mechanism 12 is designed to resiliently support a rear bracket 16 from below. The rear bracket 16 is formed at a rear end of the gear type transmission 3. The intermediate mounting mechanism 13 is adapted to resiliently support a bottom wall 5a of the connecting bracket 5 from below.

[Connecting Structure via Connecting Bracket 5]

In FIG. 2, the connecting bracket 5 is inclined downward of a rear portion thereof such that a fore end thereof is higher than the rear end thereof. The rear portion of the connecting bracket 5 is connected to a lower half of a fore end of the gear type transmission 3 via two bolts 20 serving as second tightening members. The two bolts 20 are inserted into bolt insertion holes or the like, described later, from a right side of the connecting bracket 5.

Figure 5:
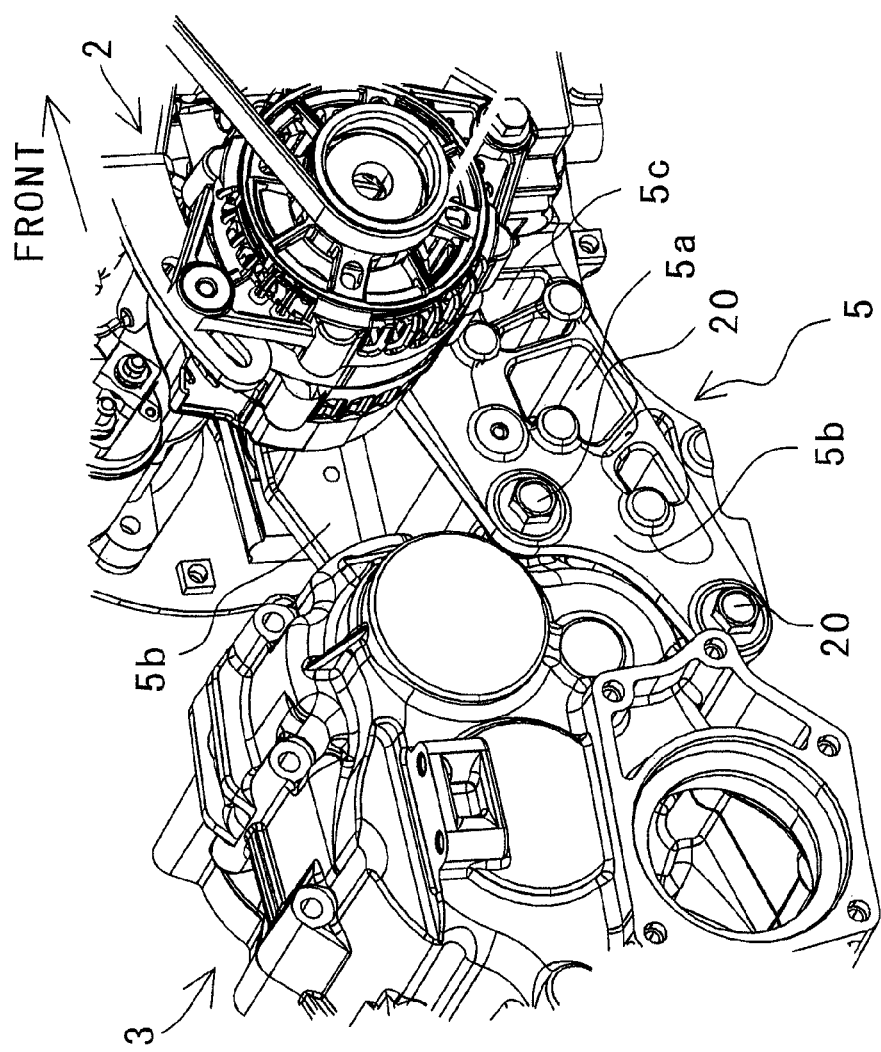
FIG. 5 is an enlarged perspective view showing a connected section of the power unit shown in FIG. 1, as viewed upward on the rear right side.

FIG. 5 is a perspective view showing a connected section via the connecting bracket 5, as viewed on the right from upper rear portion. The connecting bracket 5 includes the bottom wall 5a, a pair of side walls 5b extending from right and left ends of the bottom wall 5a, and a front wall 5c as mentioned above. The walls are formed to have a U-shaped cross section substantially perpendicular to the lengthwise direction of the connecting bracket 5.

A description will be made of the connecting structure at the rear end of the connecting bracket 5.

Figure 4:
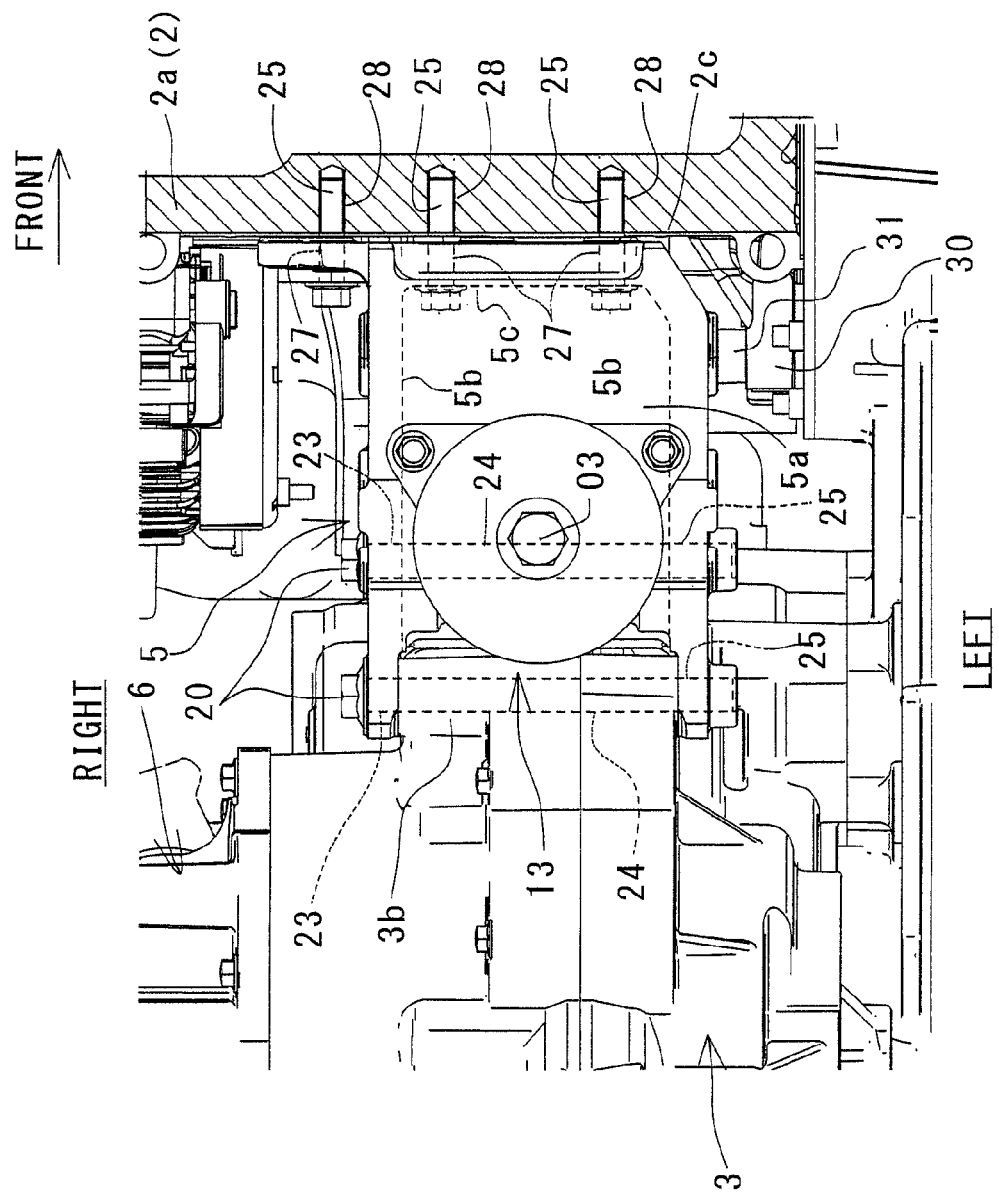
FIG. 4 is an enlarged bottom view showing a connecting bracket shown in FIG. 1.

FIG. 4 is an enlarged bottom view showing the connecting bracket 5. A fore end boss (i.e., a second connector) 3b of the gear type transmission 3 is fitted between rear ends of the right and left side walls 5b of the connecting bracket 5, thereby determining the relative position between the connecting bracket 5 and the transmission 3 in the vehicular widthwise direction. Bolt insertion holes 23 and 24 (i.e., second mounting holes) whose axes penetrate in the vehicular widthwise direction are formed at one of the right and left side walls 5b, for example, the right side wall 5b and the fore end boss 3b of the transmission 3, respectively. In contrast, female screw holes 25 are formed at positions corresponding to the bolt insertion holes 23 and 24 on the left side wall 5b of the connecting bracket 5. The bolt 20 is inserted into the bolt insertion hole 23 on the right side wall 5b of the connecting bracket 5 and the bolt insertion hole 24 of the transmission 3 from the right portion of the connecting bracket 5, to be screwed to the female screw holes 25 formed on the left wall 5b. Consequently, the fore end boss 3b of the transmission 3 and the rear end of the connecting bracket 5 are connected to each other. The shaft portion of the bolt 20 is fitted to the bolt insertion holes 23 and 24, thereby determining the lengthwise and vertical positions of the connecting bracket 5 and the transmission 3.

Next, a description will be given of the connecting structure for the fore end of the connecting bracket 5.

Figure 6:
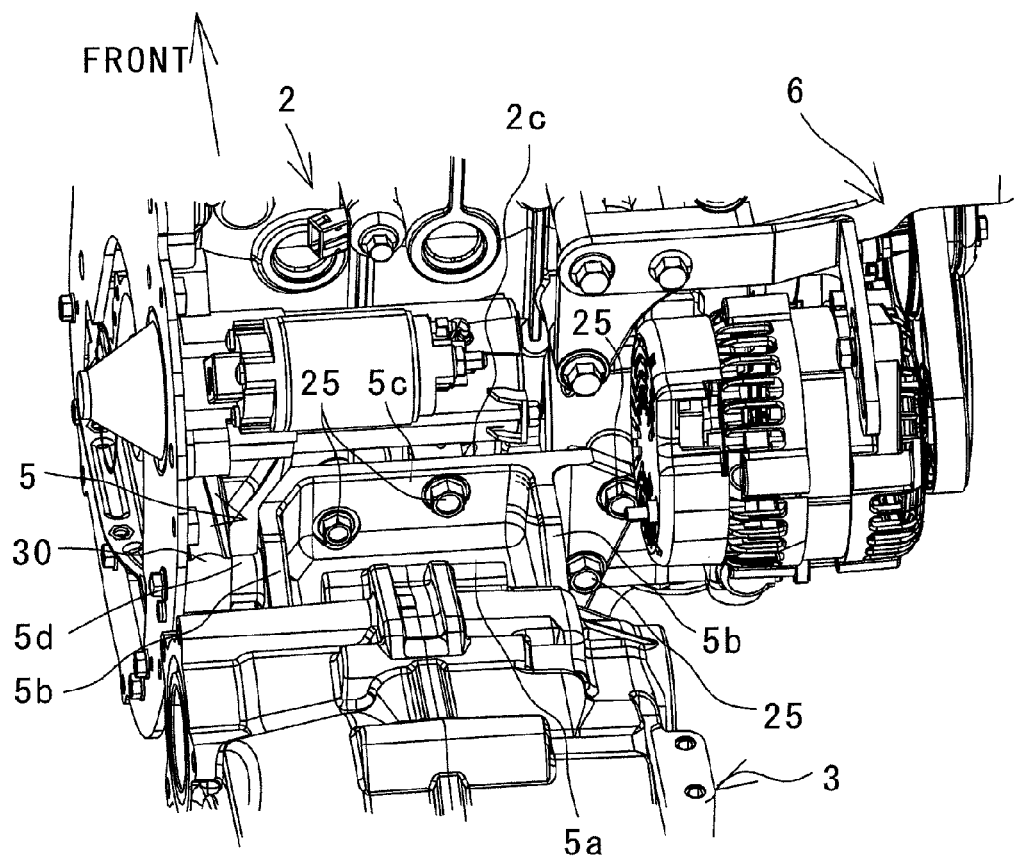
FIG. 6 is an enlarged perspective view showing the connected section of the power unit shown in FIG. 1, as viewed on the upper rear side.

FIG. 6 is a perspective view showing the fore portion of a connected section via the connecting bracket 5. The fore wall 5c of the connecting bracket 5 is formed substantially vertically, and also extends rightward from the right side wall 5b.

The front wall 5c is connected to a rear end connecting surface (i.e., a first connector) 2c of the cylinder block 2a of the engine 2 via two bolts (i.e., first tightening members) 25 arranged between the right and left side walls 5b and two bolts (i.e., first tightening members) 25 arranged at the rightward extending portion (that is, four bolts in total).

In FIG. 4, the connecting surface 2c at the rear end of the cylinder block 2a is formed within a substantially vertical plane substantially orthogonal to the vehicular lengthwise direction, and has four female screw holes (i.e., first mounting holes) 28 corresponding to the bolts 25, respectively. Each of the female screw holes 28 is formed in such a manner that its axis extends in the vehicular lengthwise direction. Moreover, bolt insertion holes 27 corresponding to each of the female screw holes 28 are formed on the front wall 5c of the connecting bracket 5. Each of the bolt insertion holes 27 is formed in such a manner that its axis extends in the vehicular lengthwise direction.

A fore end of the front wall 5c of the connecting bracket 5 is matched with the connecting surface 2c of the cylinder block 2a. Each of the bolts 25 is inserted into each of the bolt insertion holes 27 on the front wall 5c from the rear portion. And then, the bolt 25 is screwed into the female screw hole 28 at the connecting surface 2c.

In this manner, the front wall 5c of the connecting bracket 5 is connected to the rear end connecting surface 2c of the cylinder block 2a.

In the present embodiment, existing female screw holes that have been formed for mounting other fixtures are utilized as the four female screw holes 28 at the rear end connecting surface 2c of the cylinder block 2a.

A stopper 30 facing the left side wall 5b of the connecting bracket 5 from the left portion is formed at a rear left end of the cylinder block 2a. Meanwhile, a portion 31 to be stopped is formed on the left side wall 5b of the connecting bracket 5, and projects leftward. The portion 31 to be stopped abuts against the stopper 30 from right side, thereby determining a relative position of the connecting bracket 5 with respect to the cylinder block 2a in the vehicular widthwise direction.

A lower surface of a rear half of the bottom wall 5a of the connecting bracket 5 is substantially horizontally formed, and the intermediate mounting mechanism 13 is connected to the lower surface thereof.

[Mounting Structure for Power Unit U]

Figure 15:
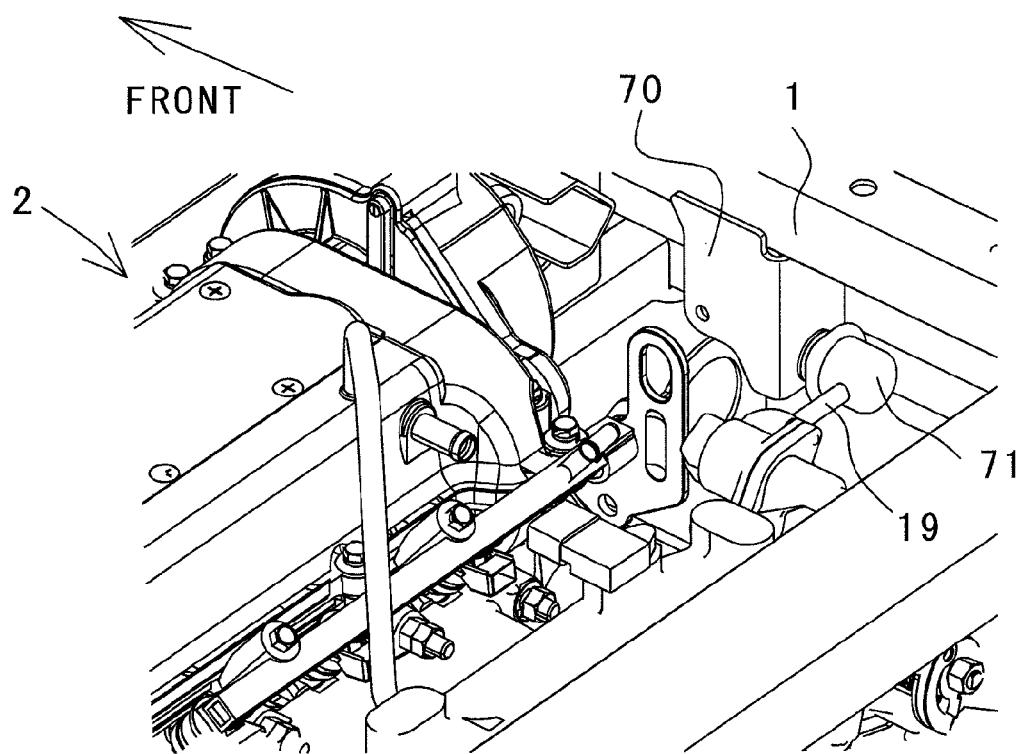
FIG. 15 is a perspective view showing the vicinity of a torque rod for the power unit shown in FIG. 1.

In FIG. 2, the power unit U is mounted to the upper surface of the lower frame member 1a by the front, rear, and intermediate mounting mechanisms 11, 12, and 13 with the dampers, as described above. Moreover, as shown in FIG. 15, the upper end of the engine 2 on the right is supported by the chassis frame 1 by a torque rod 19, thus suppressing the power unit U from rolling. Description will be made below of the arrangement and specific structure of each of the mounting mechanisms 11, 12, and 13 and torque rod 19.

In FIG. 3, the front mounting mechanism 11 is arranged such that its center O1 is located substantially on a center line O1 of the engine 2 in the vehicular widthwise direction, whereas the rear mounting mechanism 12 is arranged such that its center O2 is located substantially at the center of the transmission 3 in the vehicular widthwise direction. Although it is desirable that the center O2 of the rear mounting mechanism 12 should be located on the center line C1 of the engine 2 in the vehicular widthwise direction, the center O2 of the rear mounting mechanism 12 in the embodiment is slightly shifted leftward of the center line C1 of the front mounting mechanism 11. A shift of the center O2 of the rear mounting mechanism 12 with respect to the center O1 of the front mounting mechanism 11 falls within, for example, angle $\theta 1=\pm 5°$ around the center O1 of the front mounting mecha-nism 11 with respect to the Center line C1 of the engine 2 in the vehicular widthwise direction.

Although it is desirable that the center O3 of the intermediate mounting mechanism 13 should be located on the center line C1 of the engine 2 in the vehicular widthwise direction, it is slightly shifted leftward in the embodiment. A shift of the center O3 of the intermediate mounting mechanism 13 with respect to the center O1 of the front mounting mechanism 11 is about angle $\theta 1=\pm 5°$ around the center O1 of the front mounting mechanism 11 with respect to the center line C1 of the engine 2 in the vehicular widthwise direction.

[Detailed Structure of Front Mounting Mechanism 11]

Figure 7:
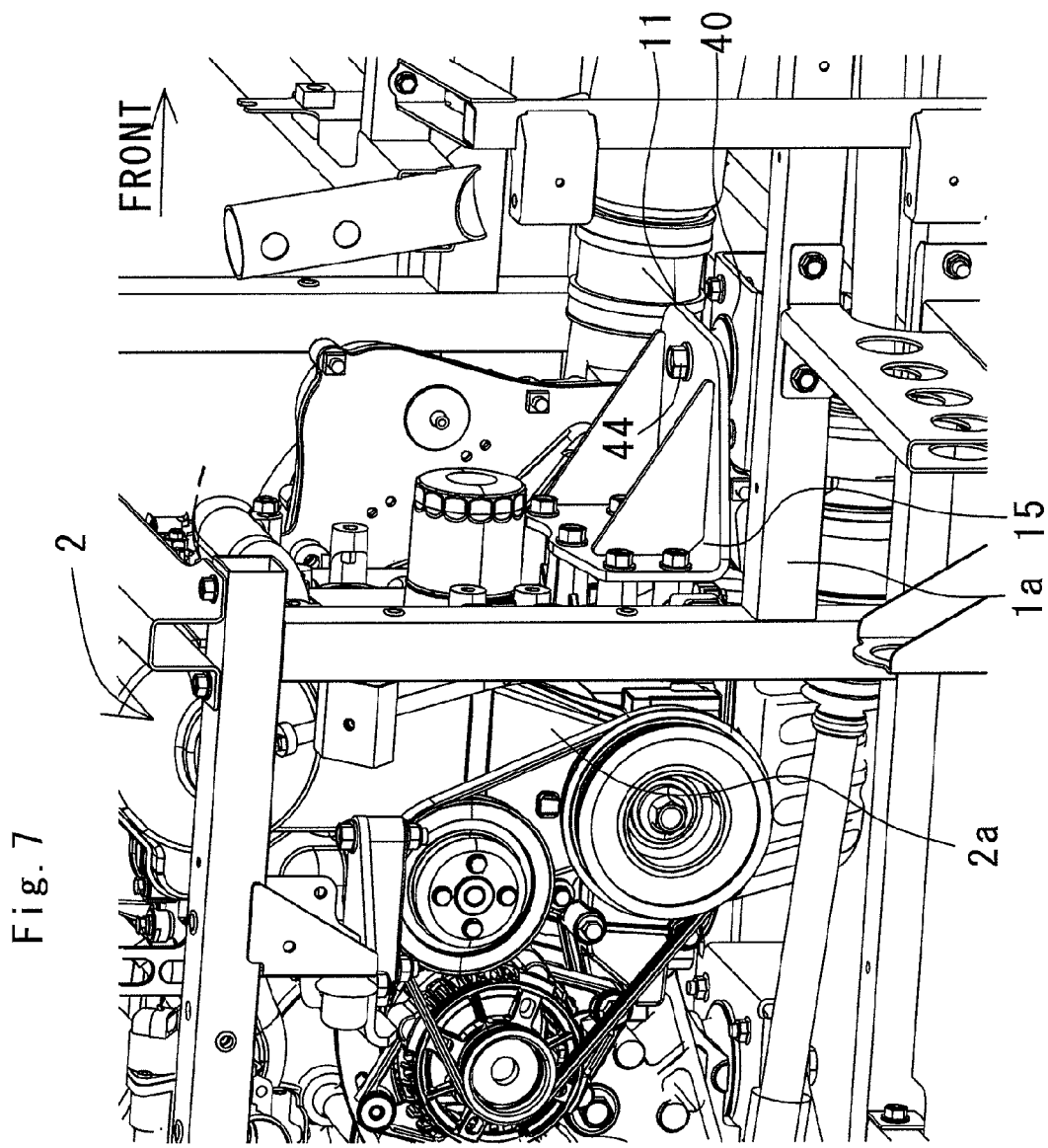
FIG. 7 is a perspective view showing a front mounting mechanism for the power unit shown in FIG. 1.
Figure 8:
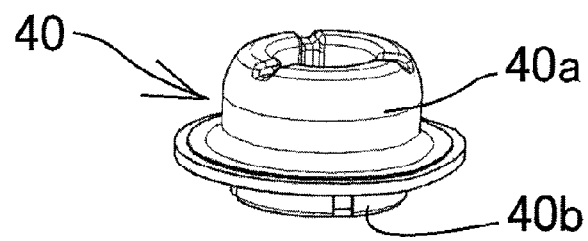
FIG. 8 is a perspective view showing a damper in the front mounting mechanism shown in FIG. 7.
Figure 9:
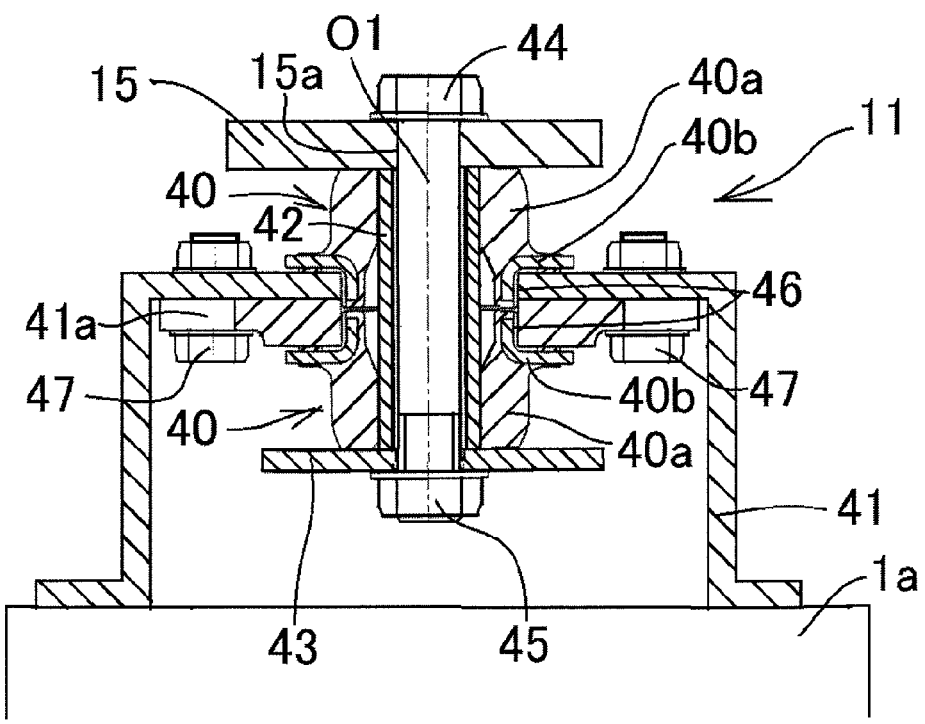
FIG. 9 is a longitudinal cross-sectional view showing the front mounting mechanism shown in FIG. 7.

FIG. 7 is a perspective view showing the front mounting mechanism 11; FIG. 8 is a perspective view showing a rubber damper for the front mounting mechanism 11; and FIG. 9 is a vertical cross-sectional view in a direction perpendicular to the lengthwise direction of the front mounting mechanism. In FIG. 7, the front bracket 15 is formed into a substantially L shape, as viewed sideways. The substantially vertical wall of the front bracket 15 is securely fixed to the fore surface of the cylinder block 2a of the engine 2. A rubber damper 40 for the front mounting mechanism 11 is mounted to the lower surface of the bottom wall of the front bracket 15.

In FIG. 8, the rubber damper 40 includes a cylindrical rubber body 40a and an annular washer 40b thermally press-fitted to one end of the rubber body 40a in a vertical direction. The washer 40b is formed so as to have a substantially L-shaped cross section.

In FIG. 9, an inversed U-shaped bracket 41 is securely fixed at the upper surface of the lower frame member (i.e., a member extending in the vehicular widthwise direction) 1a of the chassis frame 1 via a bolt, not shown. A reinforcing plate 41a also serving as a spacer is securely fixed to the lower surface of the upper wall of the bracket 41 via a bolt 47 or the like. A damper mounting hole 46 that penetrates in the vertical direction is formed on the upper wall of the mounting bracket 41 and the reinforcing plate 41a.

The front mounting mechanism 11 is provided with the pair of upper and lower rubber dampers 40. The upper rubber damper 40 is disposed on the upper wall of the bracket 41 with the washer 40b oriented downward. The cylindrical portion of the washer 40b is fitted to the mounting hole 46 in a vertically movable manner. Meanwhile, the lower rubber damper 40 is disposed below the reinforcing plate 41a with the washer 40b oriented upward, and the cylindrical portion of the washer 40b is fitted to the mounting hole 46 of the reinforcing plate 41a in a vertically movable manner.

A collar 42 penetrating both of the rubber dampers 40 in the vertical direction is inserted at the inner circumferential surfaces of the upper and lower rubber dampers 40. An annular pressing plate 43 made of metal abuts against the lower end of the collar 42 from below, and the front bracket 15 of the engine 2 abuts against the upper end of the collar 42 from above.

A bolt 44 is inserted from above into the bolt insertion hole 15a of the front bracket 15, the collar 42, and the pressing plate 43. A nut 45 is screwed at the lower end of the bolt 44, thereby integrally coupling the front bracket 15, the collar 42, and the pressing plate 43, and the upper and lower rubber dampers 40 are compressed in the vertical direction at a predetermined initial set load.

The front mounting mechanism 11 having the above structure can resiliently absorb or suppress by the compression of either one of the dampers 40 even in the case where the front bracket 15 of the engine 2 is vibrated either upward or downward with respect to the lower frame member 1a. For example, in the case where the front bracket 15 is separated upward from the lower frame member 1a, the lower rubber damper 40 is compressed. To the contrary, in the case where the front bracket 15 approaches the lower frame member 1a downward, the upper rubber damper 40 is compressed.

[Detailed Structure of Rear Mounting Mechanism 12]

Figure 10:
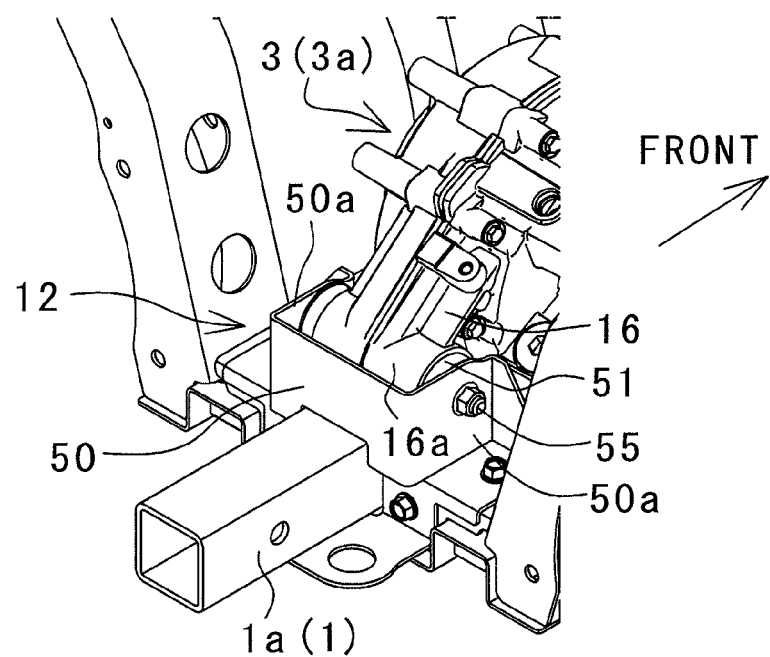
FIG. 10 is a perspective view showing a rear mounting mechanism for the power unit shown in FIG. 1.
Figure 11:
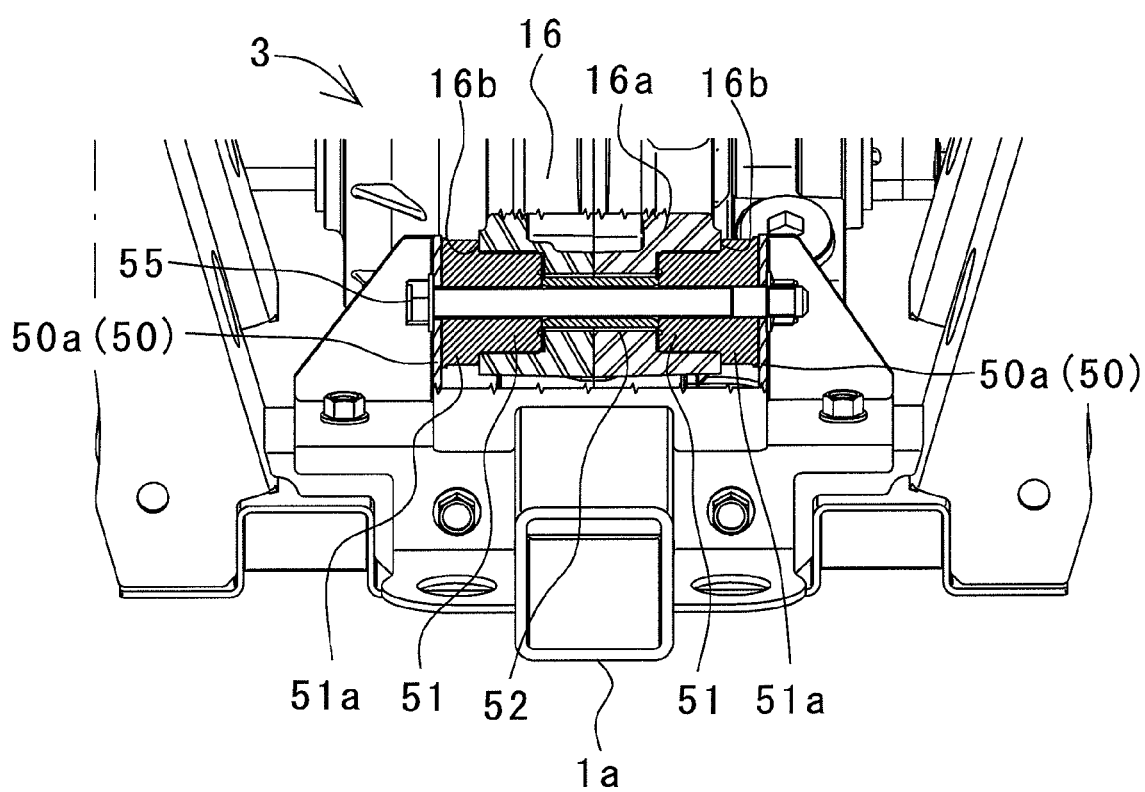
FIG. 11 is a longitudinal cross-sectional view showing the rear mounting mechanism shown in FIG. 10.

FIG. 10 is a perspective view showing the rear mounting mechanism 12; and FIG. 11 is a vertical cross-sectional view perpendicular to the lengthwise direction of the rear mounting mechanism 12. In FIG. 10, the rear bracket 16 integrally includes a cylindrical portion 16a having a cylindrical axis extending in the vehicular widthwise direction. A pair of right and left rubber bushes 51 is fitted into the cylindrical portion 16a. Meanwhile, a mounting bracket 50 formed into a substantially U shape, as viewed on a plane, is securely fixed at the upper surface of the lower frame member (i.e., a portion extending in the lengthwise direction) 1a. The right and left rubber bushes 51 are supported on right and left side walls 50a of the mounting bracket 50 via a bolt 55.

In FIG. 11, each of the rubber bushes 51 has an outward flange 51a projecting outward in a radial direction. Each of, the flanges 51a is held between the side wall 50a of the mounting bracket 50 and the end surface 16b of the cylindrical portion 16a in the vehicular widthwise direction. A pipelike metallic collar 52 is held between the right and left rubber bushes 51. The end surface of each of the rubber bushes 51 at the vehicle widthwise center abuts against the end surface of the collar 52 in the vehicular widthwise direction. A pair of right and left annular steps is formed at the inner circumferential surface of the cylinder 16a. The end surface at the vehicular widthwise center of each of the rubber bushes 51 faces each of the annular steps with a clearance.

The above-described bolt 55 is inserted into the side wall 50a of one of the mounting brackets 50 from either right or left. The bolt 55 sequentially passes through one of the rubber bushes 51, the collar 52, the other rubber bush 51, and the other side wall 50a. A nut 56 is screwed at the tip end of the bolt 55. Consequently, the rear bracket 16 of the gear type transmission 3 is supported by the lower frame member 1a via the rubber bushes 51.

The rear mounting mechanism 12 having the above configuration can absorb or suppress vibrations by the compression of either one of the rubber bushes 51 even in the case where the gear type transmission 3 is vibrated either rightward or leftward with respect to the lower frame member 1a. For example, in the case where the rear bracket 16 is vibrated leftward, the flange 51a of the left rubber bush 51 is compressed in the vehicular widthwise direction. In the case where the rear bracket 16 is vibrated rightward, the flange 51a of the right rubber bush 51 is compressed in the vehicular widthwise direction. Moreover, in the case where the rear bracket 16 is vibrated in a direction substantially perpendicular to the axis of the cylinder (i.e., vertically and lengthwise) with respect to the lower frame member 1a, both of the rubber dampers 51 are compressed in the radial direction.

[Detailed Structure of Intermediate Mounting Mechanism 13]

Figure 12:
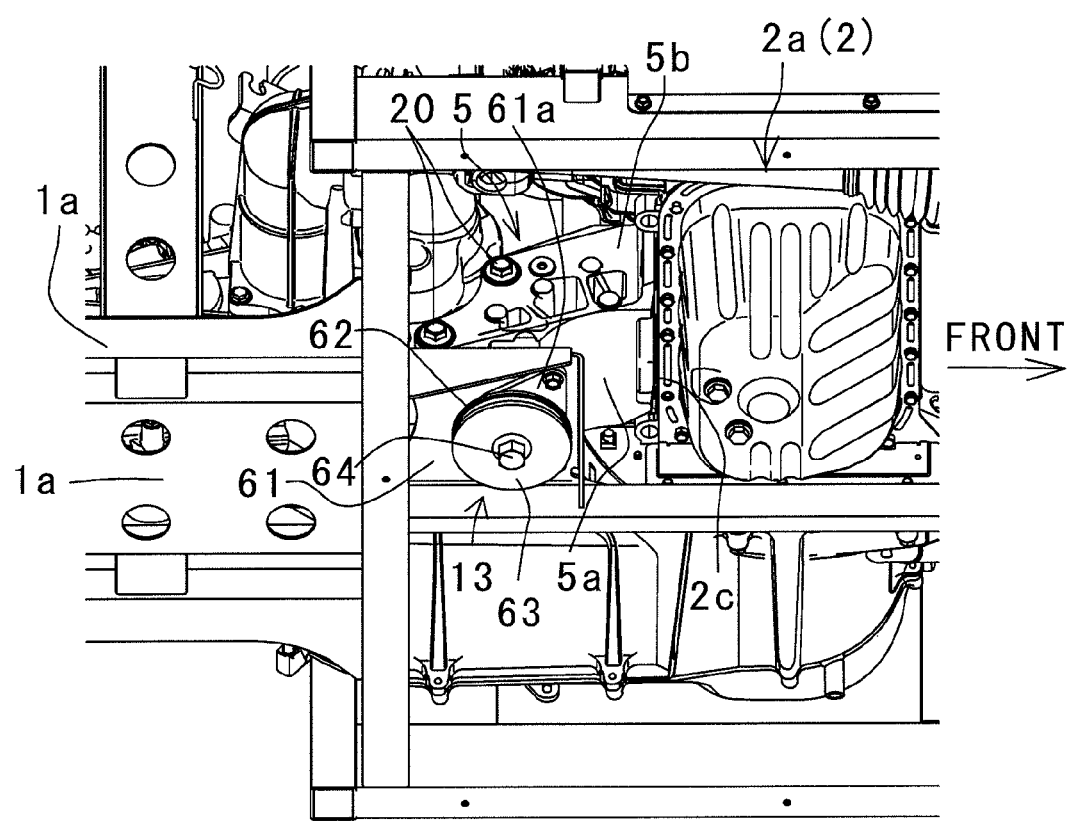
FIG. 12 is a perspective view showing a connecting bracket for the power unit shown in FIG. 1, as viewed from below.
Figure 13:
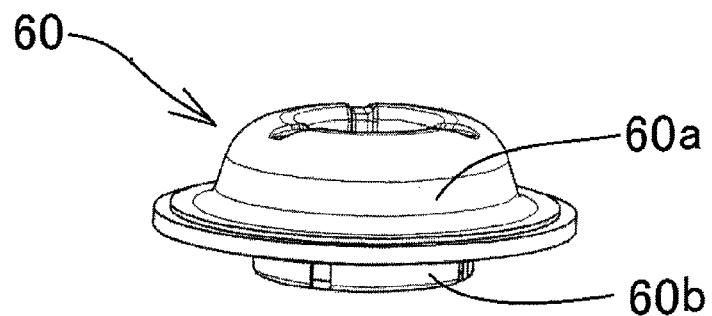
FIG. 13 is a perspective view showing a damper for an intermediate mounting mechanism shown in FIG. 1.
Figure 14:
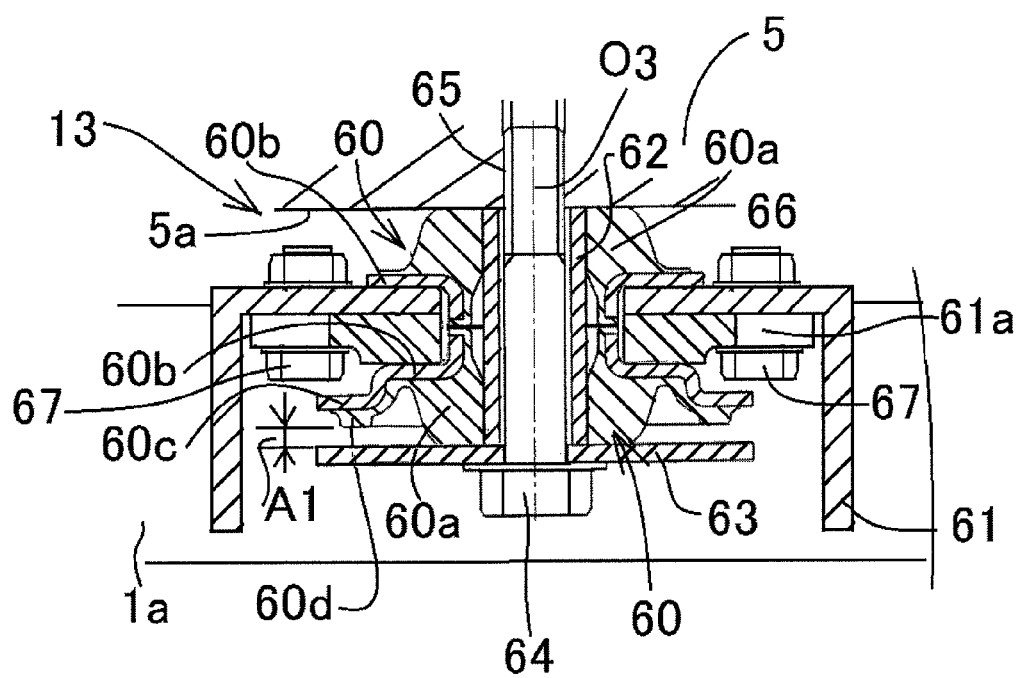
FIG. 14 is a longitudinal cross-sectional view showing an intermediate mounting mechanism shown in FIG. 12.

FIG. 12 is a perspective view showing the intermediate mounting mechanism 13, as slantwise viewed from below; FIG. 13 is a perspective view showing the rubber damper 60 for the intermediate mounting mechanism 13; and FIG. 14 is a vertical cross-sectional view showing the intermediate mounting mechanism 13 in a direction perpendicular to the lengthwise direction. In FIG. 12, an intermediate bracket 61 having a substantially horizontal intermediate mounting surface is securely fixed to the lower frame member 1a by welding or the like. A pair of upper and lower rubber dampers 60 (FIG. 14) is fixed to the intermediate bracket 61.

In FIG. 13, the rubber damper 60 basically has a structure similar to that of the above-described rubber damper 40 for the front mounting mechanism 11. The rubber damper 60 is provided with a cylindrical rubber body 60a and an annular washer 60b thermally press-fitted to one end of the rubber body 60a in the vertical direction. The washer 60b is formed into an L shape in cross section. Here, the diameter of the rubber damper 60 is greater than that of the rubber damper 40 for the front mounting mechanism 11, and therefore, is higher in rubber constant.

In FIG. 14, the intermediate bracket 61 is formed into an inversed U shape. A reinforcing plate 61a also serving as a spacer is securely fixed to the lower surface of the upper wall of the intermediate bracket 61 via a bolt 67 or the like. A damper mounting hole 66 penetrating in the vertical direction is formed at the upper wall of the intermediate bracket 61 and the reinforcing plate 61a.

The intermediate mounting mechanism 13 has the upper and lower rubber dampers 60, like the front mounting mechanism 11. Here, the lower rubber damper 60 includes an annular additional rubber 60d having a greater diameter, than that of the rubber body 60a in addition to the rubber body 60a. In this manner, a spring constant is changed at two stages according to a load, so as to further absorb vibrations. In other words, an annular additional portion 60c is formed integrally with the washer 60b at the outer peripheral end of the washer 60b via a step. The annular additional rubber 60d is disposed at the annular additional portion 60c.

A collar 62 penetrating both of the rubber dampers 60 in the vertical direction is inserted at the inner circumferential surface of the upper and lower rubber dampers 60. A metallic annular pressing plate 63 abuts against the lower end of the collar 62 from below, whereas the lower surface of the bottom wall 5a of the connecting bracket 5 abuts against the upper end of the collar 62 from above.

A bolt 64 is inserted into the bolt insertion hole of the pressing plate 63 and the collar 62 from below. The upper end of the bolt 64 is screwed to a female screw hole 65 formed in the connecting bracket 5, thereby integrally coupling the connecting bracket 5, the collar 62, and the pressing plate 63. Furthermore, the upper and lower rubber dampers 60 are compressed in the vertical direction at a predetermined initial set load. The additional rubber 60d faces the upper surface of the pressing plate 63 from above with a given clearance A1 defined there between in the assembled state.

Similarly to the front mounting mechanism 11, the intermediate mounting mechanism 13 having the above structure can resiliently absorb or suppress owing to the compression of either of the dampers 60 even in the case where the connecting bracket 5 is vibrated either upward or downward with respect to the lower frame member 1a. Specifically, the lower rubber damper 60 is compressed when the connecting bracket 5 is separated upward from the lower frame member 1a, whereas the upper rubber damper 60 is compressed when the connecting bracket 5 approaches the lower frame member 1a downward.

Particularly, in the case where the connecting bracket 5 is vibrated upward to compress the lower damper 60, only the rubber body 60a is compressed while the pressing plate 63 is moved upward within the clearance A1. When the pressing plate 63 is moved upward beyond the clearance A1, the spring constant of the additional rubber 60d is added, thereby increasing the spring constant of the rubber as a whole, so as to absorb vibrations caused by a large impact force.

[Mounting Structure of Torque Rod 19]

In FIGS. 3 and 15, one end of the torque rod 19 is connected to a bracket 70 disposed in the chassis frame 1 via a ball joint 71. The other end of the torque rod 19 is connected to a bracket 72 for an alternator disposed at the upper end of the engine 2 via a ball joint 73.

[Assembly of Power Unit]

When the power unit U is assembled, first, the connecting bracket 5 is mounted to the engine 2. Specifically, as shown in FIG. 4, the fore end of the fore wall 5c of the connecting bracket 5 abuts against the rear end connecting surface 2c of the cylinder block 2a of the engine 2, and the portion 31 to be stopped on the left side wall 5b of the connecting bracket 5 abuts against the stopper 30 of the cylinder block 2a. In this manner, the connecting bracket 5 is relatively positioned in the vehicular lengthwise direction and in the vehicular widthwise direction with respect to the transmission 3. In this state, the fore wall 5c of the connecting bracket 5 is connected to the connecting surface 2c of the cylinder block 2a via the plurality of bolts 25.

The bolt 25 is inserted into the bolt insertion hole 27 from the rear portion of the fore wall 5c of the connecting bracket 5 in a substantially horizontal state, to be thus screwed to the female screw hole 28. During this bolt insertion operation, as shown in FIG. 5, the connecting bracket 5 is inclined downward from the fore end toward the rear end, thereby securing a sufficient operating space for the bolt behind the fore wall 5c. Accordingly, the bolt insertion operation can be readily achieved.

Subsequently, the rear end of the connecting bracket 5 is connected to the fore end boss 3b of the gear type transmission 3. Specifically, as shown in FIG. 4, the fore end boss 3b of the transmission 3 is held between the right and left side walls 5b at the rear portion of the connecting bracket 5, and then, the two bolts 20 are sequentially inserted into the bolt insertion hole 23 formed in the right side wall 5b of the connecting bracket 5 and the bolt insertion hole 24 formed in the connecting boss 3b from the right portion of the connecting bracket 5, to be thus screwed to the female screw hole 25 formed in the left side wall 5b.

In this fixing operation, the bolt 20 is inserted from the right portion of the connecting bracket 5. Therefore, even in the state in which the connecting bracket 5 has been already connected to the engine 2, the bolt 20 can be readily inserted without any interference with other members.

Effects of Embodiment (1) The lower end substantially at the center in the vehicular widthwise direction of the engine 2 and the lower end substantially at the center in the vehicular widthwise direction of the transmission 3 are mounted to the upper surface of the lower frame member 1a of the chassis frame 1 by the front mounting mechanism 11 with the damper and the rear mounting mechanism 12 with the damper. Consequently, the transmitting force to the chassis frame 1, caused by the vibrations of the engine 2 is transmitted as a rolling force in the vehicular widthwise direction to the chassis frame 1 on the axis substantially in the vehicular lengthwise direction, connecting the front and rear mounting mechanisms 11 and 12 to each other. Accordingly, as in the related art, the chassis frame 1 hardly receives the transmitting force caused by the engine vibrations as vertical vibrations in comparison with a structure in which more than one mounting mechanisms are arranged in the vehicular widthwise direction with intervals. Thus, a passenger does not receive any vertical vibrations, whereby an excellent ride quality is secured.

(2) The torque rod 19 restricts rolling in the vehicular widthwise direction of the power unit U, thus also absorbing or suppressing the vertical vibrations caused by the rolling so as to further improve the ride quality.

(3) The torque rod 19 is disposed in the engine 2 serving as a main vibration source for the power unit U, and therefore, the rolling of the engine can be directly stopped. In particular, since the torque rod 19 is disposed at the upper end of the engine 2, the engine 2 can be suppressed from rolling at a portion as separate as possible from the front mounting mechanism 11 (i.e., a rolling center), thus suppressing large vibrations by small force.

(4) The front mounting mechanism 11 for the engine 2 is connected to the chassis frame 1 via the bolt 44 inserted from above. The rear mounting mechanism 12 for the transmission 3 is connected to the chassis frame 1 via the bolt (i.e., a connecting shaft) 55 to be inserted in the vehicular widthwise direction. The transmission 3 is less vibrated than the engine 2 which is the vibration source, and therefore, the bolt 55 can be readily attached or detached sideways in the connecting structure with the lateral bolt 55.

(5) The gear type transmission 3 is formed independently of the engine 2. The transmission 3 is connected to one end of the engine 2 in the vehicular lengthwise direction via the connecting bracket 5. In the structure in which the engine 2 and the gear type transmission 3 are formed independently of each other but in connection to each other, the length becomes greater in comparison with a structure in which a transmission and a crank case of an engine are molded integrally with each other. However, the connecting bracket 5 at the intermediate portion is supported by the intermediate mounting mechanism 13 with the damper, thus suppressing the vertical vibrations from being transmitted to the chassis frame 1.

(6) In the structure in which the connecting bracket 5 has the intermediate mounting mechanism 13, the intermediate mounting mechanism 13 for the connecting bracket 5 is disposed on a substantially straight line connecting the front and rear mounting mechanisms 11 and 12. Finally, the power unit U is attached to the chassis frame 1 at three points, that is, at the front, rear, and middle on the substantially straight line, thus enhancing mounting strength. Moreover, it is possible to prevent the vibrations of the engine 2 from being transmitted to the chassis frame 1 as the vertical vibrations.

(7) The largest load is exerted on the middle portion in the vehicular lengthwise direction of the power unit U when the engine is vibrated. However, the damping function of the intermediate mounting mechanism 13 for the connecting bracket 5 can switch the spring constant at the two stages. Consequently, only the rubber body 60a can absorb the vibrations at a relatively small spring constant in the case of the small vibrations. In the case where a large impact is exerted, the stopper function can be exhibited at the large spring constant added with the spring constant of the additional rubber 60d so as to suppress the large vibrations. That is, a vibration preventing effect is kept while an excessive load can be prevented from being exerted on the engine.

(8) The respective rubber dampers 40 and 60 of the front mounting mechanism 11 and the intermediate mounting mechanism 13 are configured in such a manner as to be compressed to absorb the vibrations in the case of either the upward vibrations or the downward vibrations in the power unit U. No tension is exerted on the rubber damper 40 or 60, thus prolonging the maintenance or replacement timing of both of the dampers 40 and 60.

Other Embodiments (1) According to the present invention, the power unit U may be supported at only two points, that is, the front mounting mechanism 11 and the rear mounting mechanism 12.

(2) The torque rod 19 may be mounted to portions other than the upper right end of the engine 2. As long as the rolling can be suppressed, the torque rod 19 may be mounted anywhere rightward, rearward, and forward of the engine. Moreover, the torque rod may be mounted to the gear type transmission. Additionally, a plurality of torque rods may be disposed.

(3) In the above embodiment shown in FIG. 3, the rear center O2 of the rear mounting mechanism 12 for the gear type transmission 3 in the vehicular widthwise direction is disposed within the range θ1 of about ±5° at the fore center O1 with respect to the center line C1 passing the fore center O1 of the engine 2 in the vehicular lengthwise direction. However, the present invention is not limited to the above range θ1±5° and includes a structure in which the rear center O2 falls within an angular range wider than the above range. In other words, the present invention is applicable to a structure in which the transmitting force to the chassis frame, caused by the engine vibrations, may act on the chassis frame 1 in such a manner as to roll on the line C1 connecting the front and rear mounting mechanisms to each other.

(4) A power unit including a crank case for an engine and a case for a gear type transmission that are formed integrally with each other also falls under the applicable scope of the present invention.

(5) Although the power unit has the parallel 3-cylinder engine in the above embodiment, the present invention is also applicable to multiple cylinder parallel engine having two or four or more cylinders or a V type engine.

(6) The present invention is also applicable to a power unit in which a gear type transmission is tightened in front of an engine.

(7) The transmission connected to the fore or rear portion of the engine is not limited to the gear type transmission. Therefore, the present invention is also applicable to a power unit connected to a chain type transmission or a hydraulic transmission.

(8) A tightening member provided in the front mounting mechanism is not limited to the bolt, and other tightening members such as a structure provided with a stopper pin in a shaft-like pin and a rivet may be used.

(9) The connecting shaft provided in the rear mounting mechanism is not limited to the bolt, and other tightening members such as a structure provided with a stopper pin in a shaft-like pin and a rivet may be used.

(10) The present invention is not limited to the structure in the above embodiment. Therefore, the present invention encompasses various modifications within a scope without departing from the contents described in the claims.

What is claimed is:

1. A mounting structure of a power unit for a utility vehicle, the power unit including an engine and a transmission coupled onto one side of the engine in a vehicular lengthwise direction, comprising:
   a front mounting mechanism with a first damper and a rear mounting mechanism with a second damper, wherein a lower end substantially at the center of the engine in a vehicular widthwise direction and a lower end substantially at the center of the transmission in the vehicular widthwise direction are mounted to an upper surface of a chassis frame by the front mounting mechanism with the first damper and the rear mounting mechanism with the second damper;
   a connecting bracket, wherein the transmission is formed independently of the engine, and is connected to one end of the engine in the lengthwise direction by the connecting bracket; and
   an intermediate mounting mechanism with a third damper, wherein the connecting bracket is mounted to the upper surface of the chassis frame by the intermediate mounting mechanism with the third damper on a straight line connecting the front mounting mechanism and the rear mounting mechanism to each other.

2. The mounting structure of the power unit for a utility vehicle according to claim 1, further comprising a torque rod for restricting the power unit from rolling in the vehicular widthwise direction, the torque rod being stretched between the power unit and the chassis frame.

3. The mounting structure of the power unit for a utility vehicle according to claim 2, wherein the torque rod is disposed at an upper portion of the engine.

4. The mounting structure of the power unit for a utility vehicle according to claim 1, further comprising:
   a tightening member, wherein the front mounting mechanism for the engine is connected to the chassis frame via the tightening member to be inserted from above, and
   a connecting shaft, wherein the rear mounting mechanism for the transmission is connected to the chassis frame via the connecting shaft to be inserted in the vehicular widthwise direction.

* * * * *